United States Patent [19]

Corsi

[11] Patent Number: 4,838,531
[45] Date of Patent: Jun. 13, 1989

[54] APPARATUS AND A METHOD OF SUPPORT AND RETAINING A CURVED SHEET IN POSITION

[75] Inventor: Armando Corsi, Piacenza, Italy
[73] Assignee: Jobs S.p.a., Italy
[21] Appl. No.: 122,047
[22] Filed: Nov. 17, 1987

[30] Foreign Application Priority Data

Jun. 4, 1987 [IT] Italy ................................ 44805 A/87

[51] Int. Cl.$^4$ ............................................. B25B 11/00
[52] U.S. Cl. .......................................... 269/21; 269/71
[58] Field of Search ....................... 269/21, 71, 75, 76; 279/3; 294/64.1

[56] References Cited

U.S. PATENT DOCUMENTS

| | | | |
|---|---|---|---|
| 4,088,312 | 5/1978 | Frosch et al. | 269/21 |
| 4,491,306 | 1/1985 | Eickhorst | 269/21 |
| 4,497,476 | 2/1985 | Wiele | 269/21 |

Primary Examiner—Eugene R. LaRoche
Assistant Examiner—Robert J. Pascal
Attorney, Agent, or Firm—McGlew & Tuttle

[57] ABSTRACT

An apparatus for supporting and retaining in position a curved sheet (5) which is to be subjected to a machining operation comprising a plurality of support devices (6) spaced apart at regular intervals on a support plate (7), which support devices are positionable at predetermined locations to support and retain the sheet (5), wherein each support device (6) comprises a sliding support member (10) positionable against a contact member, the support member having means (12) capable of adhering to a sheet (5) pivotally mounted thereon, and control means (31) for controlling the pivotal movement of the adhesion means (12) so as to bring the sheet (5) into contact with the positioned support member (6) and to hold the sheet in position to permit machining to take place.

5 Claims, 3 Drawing Sheets

APPARATUS AND A METHOD OF SUPPORT AND RETAINING A CURVED SHEET IN POSITION

FIELD OF THE INVENTION

The present invention relates to an apparatus and method of retaining a curved sheet in position. More particularly, but not essentially the apparatus and method of the present invention are intended for retaining aircraft panels or the like, which are to be subjected to machining operations such as cutting, contouring and drilling using automatic machine tools.

BACKGROUND OF THE INVENTION

Apparatuses are known which are used to retain curved sheets in position. Such devices comprise a plurality of devices spaced apart at regular intervals on a support plane in a grid-like arrangement. Each device is provided with means for adhesion to the sheet to be retained in order to hold the sheet in position. Furthermore, each of the devices is positioned automatically, independently of all other devices, at a predetermined height so as to match the profile of the sheet in the region of the support device. The sheet is thus supported at a certain number of points on its surface, regardless of the configuration thereof.

In industry, particularly the aircraft industry, it is frequently necessary to perform precision machining on sheets or similar two dimensional units having a curved surface. Obviously, for precise machining to be achieved, it is essential to position the sheet with maximum accuracy and to retain it in a fixed position whilst the various machining operations are being effected. The difficulties which arise when the sheet or panel has length and breadth dimensions of the order of meters but a thickness of the order of millimeters and has a curved surface, but which must, nevertheless, be retained in position without being deformed or damaged will be readily apparent.

The use of fixed profiles corresponding to the geometry of a particular panel would be uneconomic in view of the relatively high number of profiles which it would be necessary to provide to ensure that any panel could be retained.

For this reason, apparatuses have been developed which consist of a plurality of support members which can be positioned so as to produce a support structure corresponding to the profile of the sheet. The sheet is then attached to the support members. One particular apparatus of this type is disclosed in U.S. pat. No. 4,491,306. Reference should now be made to FIG. 1 of the accompanying drawings which shows, schematically, an apparatus as disclosed in U.S. Pat. No. 4,491,306. Such an apparatus comprises a support member A which can be positioned at various heights. The upper portion of the support member A is provided with a hemispherical cup B within which a cap C of a substantially complementary shape is rotatable.

The cap C is provided, on its upper edge, with a suction cup D and the base thereof is connected to a spring E which is mounted on the base of the cup B and retains the suction cup D in the position illustrated in the figure.

Within the cup C, a pin P is provided, which pin extends radially. The upper end of the pin P coincides with the center of rotation of cap C, as is disclosed in column 4 at lines 54–57 of U.S. Pat. No. 4,491,306.

The rotatability of cap C within the cup B allows the suction cup D to correspond to the inclination of a sheet which is rested thereon. The sheet is retained in position by depressurising the interior of the cups D. The pin P also provides a further point of support for the sheet.

The possibility of automatically controlling the raising of support A so as to bring pin p in contact with the sheet being machined is also foreseen in the above-mentioned patent. To achieve this, provision is made, as described in column 5 at lines 58 et seq, for the mounting of a proximity sensor.

Such an arrangement does not, however, fully satisfy industrial requirements. The fact that the sheet itself is used as a contact for positioning the supports poses considerable problems, in that it is necessary to provide means whereby a panel having length and breadth dimensions of the order of meters can be positioned with maximum accuracy so that the support members may then be adjusted. A further disadvantage resides in the fact that the position of the upper extremity of the pin P, which constitutes a support point for the sheet, is fixed with respect to the edge of the suction cup D. In consequence, the device is not automatically adjustable so as to retain sheets of different curvature. To achieve this, the pin must be replaced by another pin of an appropriate length. Thus, in the case of concave sheets it is necessary to use a pin which projects outwardly from the suction cup and, in the case of a convex sheet, a pin which does extend as far as the suction cup.

If an excessively long, that is to say, projecting pin is used, the sheet does not adhere adequately to the suction cup, so that adhesion to the corresponding support is thus correspondingly inadequate. A pin which does not extent as far as the suction cup provides good adhesion, but it does not provide the central support point for the sheet.

SUMMARY AND OBJECTS OF THE INVENTION

The present invention therefore seeks to provide an apparatus which can be used for securing curved sheets comprising support devices which can automatically assume a given configuration and which ensure that the sheet is held effectively. In a further aspect, the present invention seeks to provide a method of securing sheets in position so that machining operations can be carried out thereon.

According to the present invention, there is provided an apparatus for supporting and retaining in position a curved sheet which is to be subjected to a machining operation comprising a plurality of support devices spaced apart at regular intervals on a support plate which support devices are positionable at predetermined locations to support and retain the sheet, wherein each support device comprises a sliding support member positionable against a contact member, the support member having means capable of adhering to a sheet pivotally mounted thereon, and control means for controlling the pivotal movement of adhesion means so as to bring the sheet into contact with the positioned support member and to hold the sheet in position to permit machining to take place.

The present invention will be further described by way of example, with reference to FIGS. 2 to 5 of the accompanying drawings, in which.

DESCRIPTION OF THE PREFERRED EMBODIMENT

Figure 2:
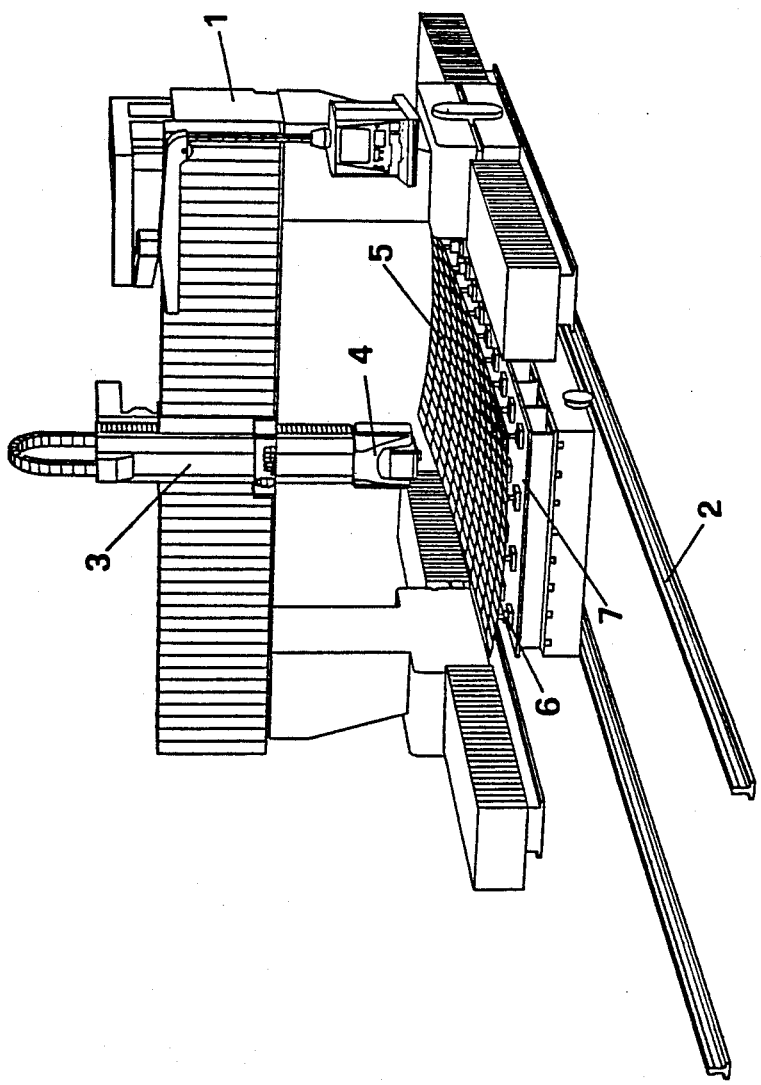
FIG. 2 is a perspective view of a machine tool incorporating an apparatus for retaining sheets in position in accordance with the present invention.

In FIG. 2 there is shown an example of an automatic machine tool used for the operation of contouring or drilling curved sheets. Such machine includes a portal structure 1, which is displaceable along guides 2. The structure 1 has a displaceable arm 3 mounted thereon. At the lower end of the arm 3 is located a toolholder head 4.

A curved sheet 5 which is to be machined is placed on and secured to, a plurality of support devices 6. These devices 6 are mounted on a base member 7 located between the guides 2 and are each equipped with means for adhering to the sheet so as to retain it in position. Each device 6 comprises a flange member 8 affixed to the base member 7 and an upright member 9 which can be immobilized at different heights relative to the flange member 8.

Within the upright member 9, a cylindrical chamber 20 is defined, within which a double-acting piston 10 is slidably displaceable. The piston 10 has mounted thereon a support member 11 for a suction cup 12 by means of a ball joint. These features are illustrated more clearly in FIG. 4.

Between the flange member 8 and the upright member 9, a collar 13 is disposed, which collar includes a projection portion 14 having an inclined surface which engages with a correspondingly-shaped surface of the flange member 8. The collar 13 is urged upwardly by means of a spring washer 15 or the like and may be tightened by means of a bolt 16 which immobilizes the upright member 9.

Substantially diametrically opposed to the bolt 16, a shaft 19 is mounted on the flange member 8. The shaft 19 has a collar integrally formed therewith which collar is provided with an eternal screw thread 18. This thread 18 meshes with a rack 17 formed on the upright member 9 and extending parallel to the longitudinal axis thereof.

As previously mentioned, a cylindrical chamber 20 is defined by the interior of the upright member 9. This chamber 20 receives the double-acting piston 10. Ducts 22 and 23 respectively carry compressed air to the lower and upper regions of the chamber 20.

At its upper end, the upright member 9 is provided with a head member 24 in which an annular chamber 25 is defined. The chamber receives a collar 26, also annular, which is provided with seals 27 on its underside to ensure a leaktight connection between the collar 26 and the annular chamber 25.

On one side, the collar 26 rests on a protuberance 28 formed on the base of the chamber 25. Substantially diametrically across the chamber from the protuberance 28, a helical spring 29 is disposed. The spring 29 presses against the base of the collar 26. A duct 30, which is connected to devices (not shown) for injecting air under pressure into the lower portion of the chamber 25, is also provided in this region of the chamber. The collar 26 serves to immobilize the piston 10 when it is in its desired position.

The piston 10 is also hollow, and a single-acting piston 31 is slidably displaceable therein. The piston 31 is guided from above by an upper cap member 32 and from below by a piston rod 33. An axial conduit 34, communicating with the interior of the chamber 35 in which piston 31 is slidably displaceable, is defined with the piston rod 33. The piston 31 is urged upwardly by means of a spring 36.

At the upper end of piston 10, a ball joint 38 is provided on which the support member 11 for the suction cup 12 is mounted. The ball joint 38 is connected, through the intermediary of a pin 39, to the upper end of piston 31 by means of a nut 40. A bush 41, made from a friction-reducing material such as nylon, is disposed between the pin 39 and the ball joint 38. The pin 39 is vertically slidably displaceable with respect to the piston 10 along a pair of slots 42.

Within the support member 11 is fitted a membrane 43, made of hard rubber, for example, of the type known by the trade name VULKOLAN. The membrane 43 abuts against the upper portion 37 of the ball joint 38. The support member 11 is pierced by a duct 44 which leads to the interior portion of the suction cup 12. At its other end, the duct 44 is connected to devices (not shown), for pumping and extracting air so as to maintain the interior of the suction cup at a higher or lower pressure than atmospheric pressure in dependence upon prevailing requirements.

The support and securing devices 6 which, in use, are disposed around the periphery of the sheet 7 are also provided with a second suction cup 45 mounted on an arm 46 which is integral with the support member 11 for the suction cup 12. The interior of the suction cup 45 is also connected by means of a duct 21, to the abovementioned devices for the delivery and extraction of air.

The suction cups 45 serve, for example, to retain a portion of the sheet which is being cut off during sheet cutting operations. This prevents, or at least minimizes, deformation and vibration which would otherwise damage the sheet or panel.

The use of the apparatus of the present invention will now be described. An approximate positioning of each support device is first performed by appropriately adjusting the height of the upright member 9. To achieve this, the bolt 16 is slackened, thereby allowing the spring washer 15 to push the collar 13 upwardly to release the upright member. The shaft 19 is then moved by rotating the collar carrying the external screw thread 18 which engages with the rack 17 and which axially displaces the upright member 9. Once the desired approximate level has been reached, the upright is once more immobilized by re-tightening the bolt 16.

Thereafter, the positioning operations will normally be performed automatically. This is because the toolholder head is usually controlled electronically through a computer system. The electronic devices which control the machine tool locate the toolholder head 4 on the upper surfaces of the support and retaining members 6 and lower these members to the level which they should occupy when the sheet is located thereon for the machining operation.

Figure 4:
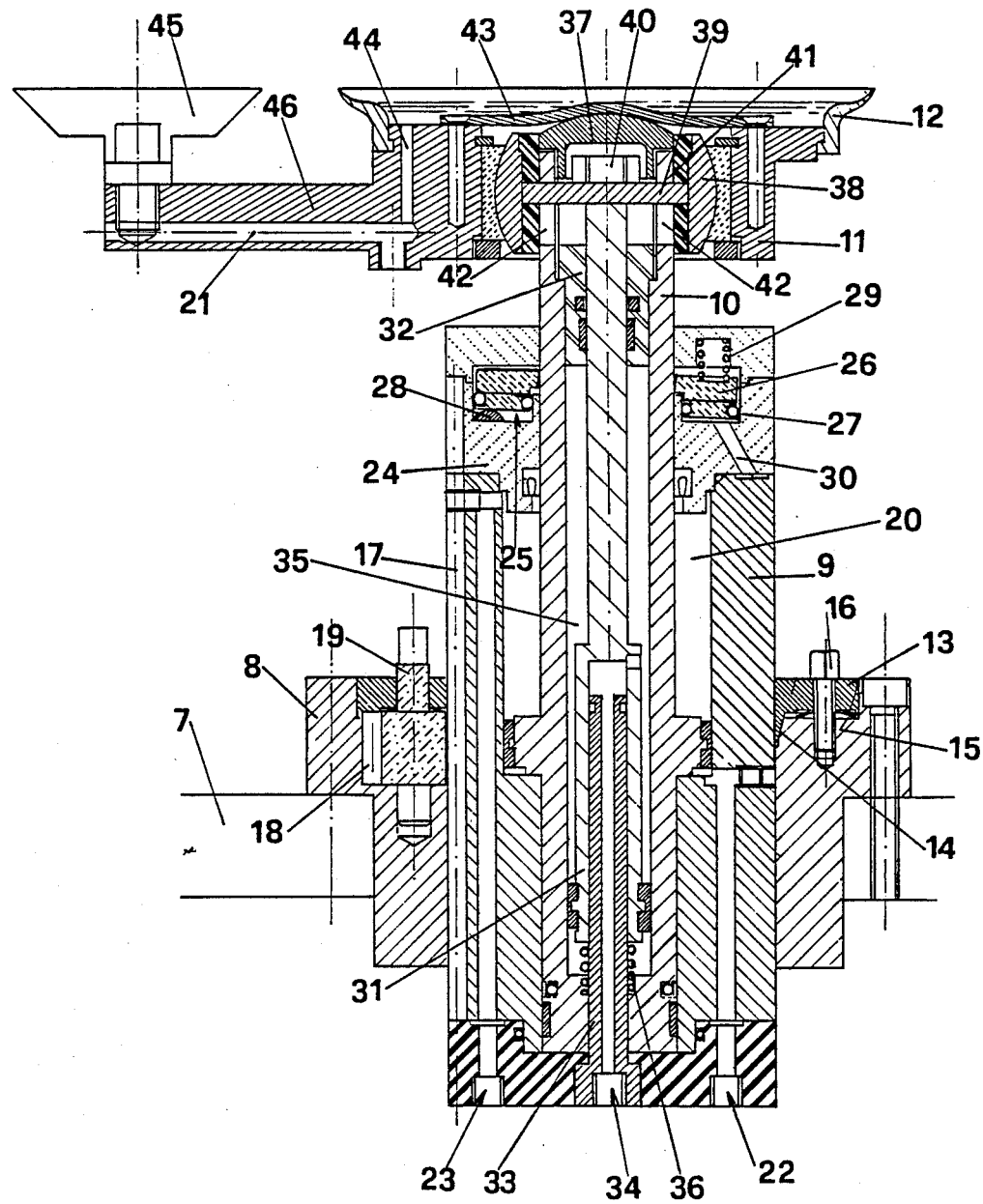
FIG. 4 is a vertical section through a device shown schematically in FIG. 3.

Compressed air is then passed into the chamber 25, below the collar 26, through the duct 30. The pressure exerted by the air lifts the collar against the force of the spring 29, thereby releasing the piston 10. At this point, compressed air is also passed into duct 22 and thence into the lower portion of the chamber 20, which causes the piston 10 to rise. Such rising entrains the raising of the single-action piston 31, which is urged upwardly by the spring 36. At this stage, the relative positions of the pistons 10 and 31 are as shown in FIG. 4.

The travel of the piston 10 is terminated when the rubber membrane 43 abuts against the toolholder head 4. Such abutment is detected by the use of sensors of a known type such as pressure sensors (not shown). The supply of air to the duct 30 is then interrupted, so that the pressure within chamber 25 drops and the spring 29 urges the collar 26 downwardly. The collar thus adopts an inclined position and immobilizes the piston 10. The computer which controls the machine tool then moves head 4 to the top of the next support and retaining member 6 and the operation is repeated.

In this way, a series of support points is obtained, which corresponds to that of the sheet to be machined. The sheet 5 is then located on the support members 6 in approximately the desired position. Thereafter, compressed air is passed into the interior of the suction cups 12 and 45 so as to create a cushion of air on which the sheet can be easily moved and positioned accurately relative to suitably preadjusted fixed lateral stops.

At this point, the position of the sheet must be stabilized before machining can be commenced. To achieve this, air is first withdrawn from the ducts 44 and 21 so as to set up a reduced pressure in the suction cups, which therefore adhere firmly to the sheet.

Figure 1:
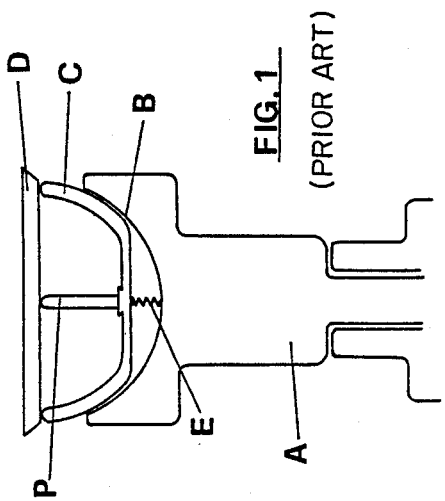
FIG. 1 is a cross-sectional view of a prior art device.
Figure 5:
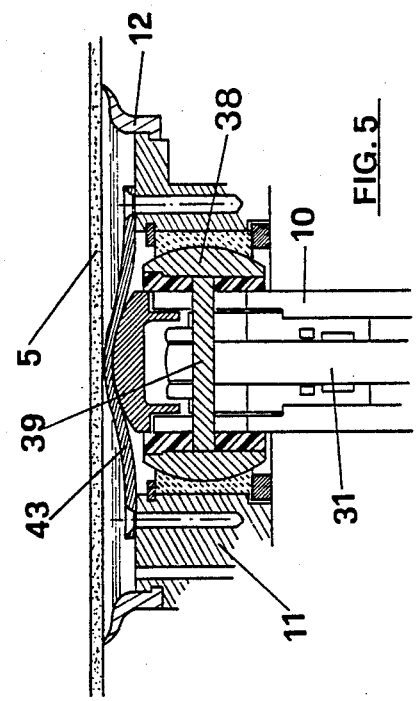
FIG. 5 is a cross-sectional view of a detail of the device shown in FIG. 4, additionally having a sheet supported thereon.
Figure 3:
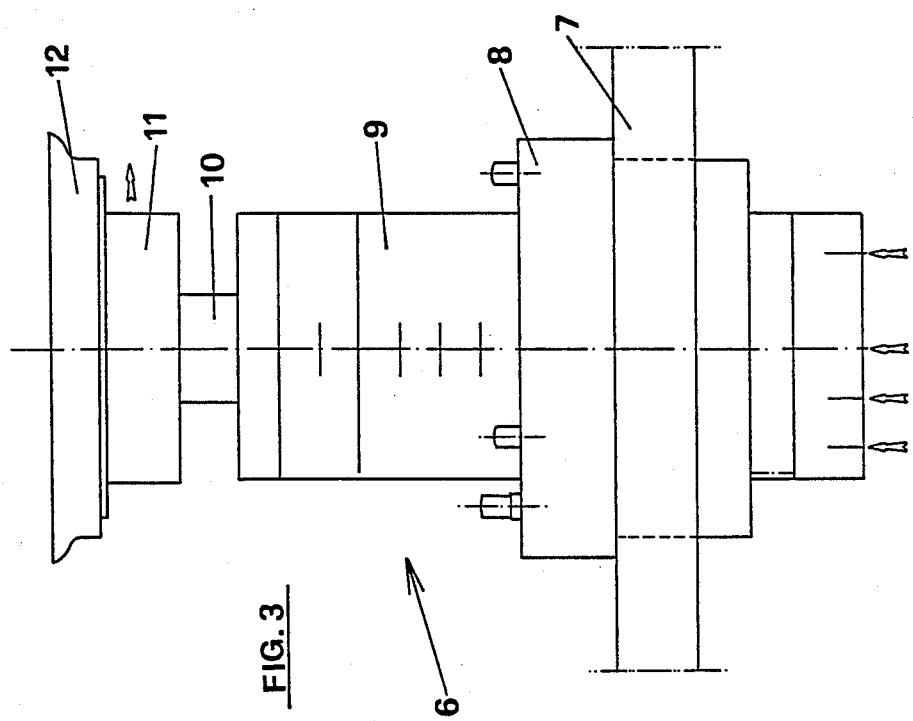
FIG. 3 is a schematic view of a support and retaining device forming a part of the apparatus according to the present invention.

The next stage provides for the delivery of compressed air along the duct 34 into the interior of the chamber 35. This overcomes the force of the spring 36 and draws the piston 31 downwardly. By so doing the pin 39 also moves downwardly in the slots 42, as do the lateral portions 38 of the ball joint and the support member 11 for the suction cup. Lowering in this manner occurs until the sheet comes into contact with the hard rubber membrane 43. This position, which is shown in FIG. 5, is maintained by suitably adjusting the pressure within the chamber 35 and maintaining it at a constant level until the machining is completed.

On completion of the machining, ambient pressure is restored to the interior of the suction cups 12, thus releasing the sheet, and also within the chamber 35 which permits the spring 36 to move the piston 31 with the ball joint and suction cup support upwardly again. If necessary, compressed air may be passed through the duct 44 to assist in the removal of the sheet.

The support and retaining device according to the present invention thus automatically matches the curvature of the sheet, irrespective of whether it is concave or convex. Moreover, the sheet is brought into contact with a support member which is automatically pre-positioned to the desired height and is held in position until the machining operation has been completed.

I claim:

1. An apparatus for supporting and retaining a curved sheet in a desired position of the type comprising a plurality of support devices spaced apart at regular intervals on a support plane, which devices are capable of being positioned at predetermined heights to support and retain the sheet, wherein each support device comprises:

an upright member slidably mounted within a support flange and immobilizable in any desired position, a pneumatically actuated double-acting piston slidably displaceable within the upright member, a collar member located within a leaktight chamber extending around the double-acting piston, which collar is displaceable between a substantially horizontal position in which the piston is free to slide and an inclined position in which the collar engages the surface of the piston and immobilizes it, a suction cup mounted on the upper end of the piston through the intermediary of a ball joint so as to permit inclination of the suction cup in any desired direction; means for injecting and extracting air from the interior of the suction cup to provide detachable adhesion of a sheet resting upon the suction cup to the cup, and a single-acting piston slidably displaceable with the double-acting piston, the single-acting piston being attached to the ball joint, the end of the single-acting piston being connected to a movable portion of the ball joint on which a support of the suction cup is mounted.

2. An apparatus for supporting and retaining in position a curved sheet which is to be subjected to a machining operation comprising: a support plate; a plurality of support devices spaced apart at regular intervals on said support plate, said support devices being positionable at predetermined locations to support and retain the sheet, each support device including a slidable support slidably positioned relative to said sheet, a suction cup and a ball joint means, said ball joint means connecting, said suction cup to said support member for permitting said suction cup to be inclined relative to said support member so as to permit movement of said suction cup so that it adopts the curvature of the sheet.

3. An apparatus according to claim 2, wherein said ball joint is connected to said support member by connection members which are free to slide relative to said support member.

4. An apparatus as claimed in claim 2 in which the displacement of the freely slidable members of the ball joint is controlled by a single-acting piston, which piston is slidably displaceable in the hollow interior of the double-acting piston, the single-acting piston being subject to the action of resilient means urging it upwardly and means being provided for the injection of a pressurized fluid into the chamber in the double-acting piston in which the single-acting piston is slidably displaceable, above the piston to control the descent thereof.

5. An apparatus for supporting and retaining in position a curved sheet which is to be subjected to a machining operation comprising: a support plate; a plurality of supports spaced apart at regular intervals on said support plate, said support devices being positionable at predetermined locations to support and retain the sheet, each support member including an upright housing member, a double acting piston positioned within said upright housing member, a slidable support member slidable with said piston, means defining an annular chamber surrounding a portion of said slidable support member, and a collar disposed within said annular chamber including a collar edge portion adapted to engage said support member to immobilize said piston, said collar being positioned on one side by a projection formed at the base of said means defining an annular chamber, a spring supported by said means defining an annular chamber engaging a portion of said collar in a region substantially diametrically opposed to said projection to urge the collar into an inclined position, fluid inlet means communicating with said chamber beneath said collar for restoring said collar to a horizontal position to overcome the force of said spring for releasing said support member.

* * * * *